US 9,400,898 B2

(12) United States Patent
Hagedorn (10) Patent No.: US 9,400,898 B2
(45) Date of Patent: Jul. 26, 2016

(54) DEVICE AND METHOD FOR DETERMINING REDUNDANCIES IN NEAR FIELD COMMUNICATION TAG DETECTION

(71) Applicant: BlackBerry Limited, Waterloo (CA)

(72) Inventor: J. David Hagedorn, Waterloo (CA)

(73) Assignee: BLACKBERRY LIMITED, Waterloo, Ontario (CA)

( * ) Notice: Subject to any disclaimer, the term of this patent is extended or adjusted under 35 U.S.C. 154(b) by 301 days.

(21) Appl. No.: 14/014,620

(22) Filed: Aug. 30, 2013

(65) Prior Publication Data

US 2015/0061839 A1    Mar. 5, 2015

(51) Int. Cl.
*G06K 7/00* (2006.01)
*G06K 7/10* (2006.01)
*G06K 19/07* (2006.01)
*H04W 4/00* (2009.01)

(52) U.S. Cl.
CPC .......... *G06K 7/0008* (2013.01); *G06K 7/10792* (2013.01); *G06K 19/0723* (2013.01); *H04W 4/008* (2013.01)

(58) Field of Classification Search
CPC ............ G06K 7/0008; G06K 7/10792; G06K 19/0723; G06Q 20/3278
USPC .................. 340/10.1, 10.2, 10.3, 10.4, 10.41, 340/10.42, 572.1; 455/41.1
See application file for complete search history.

(56) References Cited

U.S. PATENT DOCUMENTS

| 6,527,179 B1 | 3/2003 | Itoh et al. |
| 2006/0202803 A1 | 9/2006 | Yoon et al. |
| 2006/0289646 A1 | 12/2006 | Shafer |

FOREIGN PATENT DOCUMENTS

WO    2010063611 A2    6/2010

OTHER PUBLICATIONS

Counterpart European Patent Application No. 14182632.1, "Extended European Search Report" dated Jan. 16, 2015.

*Primary Examiner* — Nabil Syed
(74) *Attorney, Agent, or Firm* — Perry + Currier, Inc.

(57) ABSTRACT

A device and method for determining redundancies in near field communication tag detection are provided. A device comprising: a sensor configured to receive NFC tag identifiers from at least one near field communication (NFC) tag; and, a processor configured to: compare a first NFC tag identifier to a second NFC tag identifier, both the first NFC tag identifier and the second NFC tag identifier having been received by the sensor within a given time period; when the first NFC tag identifier and the second NFC tag identifier are the same, infer that the first NFC tag identifier and the second NFC tag identifier are associated with a single NFC tag; and when the first NFC tag identifier and the second NFC tag identifier are not the same, infer that the first NFC tag identifier and the second NFC tag identifier are associated with two different NFC tags.

16 Claims, 9 Drawing Sheets

DEVICE AND METHOD FOR DETERMINING REDUNDANCIES IN NEAR FIELD COMMUNICATION TAG DETECTION

FIELD

The specification relates generally to devices, and specifically to a device and method for determining redundancies in near field communication tag detection.

BACKGROUND

Current algorithms for detecting near field communication (NFC) tags may be deficient in that they may use a timeout combined with a determination of an NFC tag's low level RF (radio-frequency) technology, to filter duplicate detections, sometimes called redundant detection. For example, if two tags are detected by an NFC reader within a given amount of time, and they are determined to use the same RF technology, an NFC reader may determine that the same NFC tag has been detected twice (i.e., the second detection is redundant), even when the two tags are different.

BRIEF DESCRIPTIONS OF THE DRAWINGS

For a better understanding of the various implementations described herein and to show more clearly how they may be carried into effect, reference will now be made, by way of example only, to the accompanying drawings in which.

DETAILED DESCRIPTION

In general, this disclosure is directed to a device, and in particular a mobile electronic device, for detecting near field communication (NFC) tags. In general, mobile electronic devices represent electronic devices that are readily movable from place to place. In particular, such devices can include an NFC sensor and/or NFC reader that can be used to detect NFC tags. As the device is handheld, it can be moved rapidly from NFC tag to NFC tag, for example, within a few interrogation cycles of the NFC sensor, which can lead to falsely detecting that one tag has been detected twice (e.g. colloquially referred to as "double tapping") when two different tags have actually been detected, within a short period of time. Hence, this specification describes various implementations of a device that can more accurately determine redundancies in near field communication tag detection.

In this specification, elements may be described as "configured to" perform one or more functions or "configured for" such functions. In general, an element that is configured to perform or configured for performing a function is configured to perform the function, or is suitable for performing the function, or is adapted to perform the function, or is operable to perform the function, or is otherwise capable of performing the function.

In this specification, elements may be described as being configured to "infer" a condition of a device and/or system, and/or a state of a device and/or system. In general, an element that is configured to infer or configured for inferring a condition is configured to determine the condition, is configured to derive the condition, is configured to conclude that the condition exists, is configured to decide that the condition exists, and the like.

Further, in this specification, NFC technologies are described which can, in some implementations, refer to a specific standard including, but not limited, to one or more of ISO/IEC 18092/ECMA-340, ISO/IEC 14443, and ISO/IEC 21481/ECMA-352. In general, however, any short range RF technology for exchanging and/or transmitting and/or receiving data and/or power using contactless integrated circuits are within the scope of present implementations, including, but not limited to, one or more of induction based contactless technologies, NFC technologies, RFID (radio-frequency identifier) technologies and the like.

An aspect of the specification provides a device comprising: a sensor configured to receive NFC tag identifiers from at least one near field communication (NFC) tag; and, a processor configured to: compare a first NFC tag identifier to a second NFC tag identifier, both the first NFC tag identifier and the second NFC tag identifier having been received by the sensor within a given time period; when the first NFC tag identifier and the second NFC tag identifier are the same, infer that the first NFC tag identifier and the second NFC tag identifier are associated with a single NFC tag; and when the first NFC tag identifier and the second NFC tag identifier are not the same, infer that the first NFC tag identifier and the second NFC tag identifier are associated with two different NFC tags.

The device can further comprise a memory configured to store the NFC tag identifiers from the at least one NFC tag. The processor can be further configured to: when the first NFC tag identifier is received, store the first NFC tag identifier at the memory. The processor can be further configured to: when the second NFC tag identifier is not received within the given time period, delete the first NFC tag identifier from the memory.

The device of claim 1, wherein the processor can be further configured to: when the first NFC tag identifier and second NFC tag identifier are the same, provide one notification of detecting the single NFC tag.

The processor can be further configured to: when the first NFC tag identifier and second NFC tag identifier are not the same, provide respective notifications of detecting each of the two different NFC tags.

The given time period can be one or more of: between about 0.5 seconds and about 2 seconds; and, less than about 2 seconds.

The processor can be further configured to: when the first NFC tag identifier and the second NFC tag identifier are the same implement an action associated with receipt of a single NFC tag identifier; and when the first NFC tag identifier and the second NFC tag identifier are not the same, implement an action associated with the receipt of two different NFC tag identifiers.

The processor can be further configured to: when the first NFC tag identifier and second NFC tag identifier are the same, but are received in a time period greater than the given time period, determine that the single NFC tag has been detected twice, and that a redundant detection of the single NFC tag has not occurred. The processor can be further configured to: provide a respective notification of each detection of the single NFC tag.

Another aspect of the specification provides a method comprising: at a device comprising; a sensor configured to receive NFC tag identifiers from at least one near field communication (NFC) tag; and, a processor, comparing a first NFC tag identifier to a second NFC tag identifier, both the first NFC tag identifier and the second NFC tag identifier having been received by the sensor within a given time period; when the first NFC tag identifier and the second NFC tag identifier are the same, inferring that the first NFC tag identifier and the second NFC tag identifier are associated with a single NFC tag; and when the first NFC tag identifier and the second NFC tag identifier are not the same, inferring that the first NFC tag identifier and the second NFC tag identifier are associated with two different NFC tags.

The method can further comprise when the first NFC tag identifier is received, storing the first NFC tag identifier at a memory of the device. The method can further comprise: when the second NFC tag identifier is not received within the given time period, deleting the first NFC tag identifier from the memory.

The method can further comprise: when the first NFC tag identifier and second NFC tag identifier are the same, providing one notification of detecting the single NFC tag.

The method can further comprise: when the first NFC tag identifier and second NFC tag identifier are not the same, providing respective notifications of detecting each of the two different NFC tags.

The given time period can be one or more of: between about 0.5 seconds and about 2 seconds; and, less than about 2 seconds.

The method can further comprise: when the first NFC tag identifier and the second NFC tag identifier are the same implementing an action associated with receipt of a single NFC tag identifier; and when the first NFC tag identifier and the second NFC tag identifier are not the same, implementing an action associated with the receipt of two different NFC tag identifiers.

The method can further comprise: when the first NFC tag identifier and second NFC tag identifier are the same, but are received in a time period greater than the given time period, determining that the single NFC tag has been detected twice, and that a redundant detection of the single NFC tag has not occurred. The method can further comprise: providing a respective notification of each detection of the single NFC tag.

Yet a further aspect of the specification provides a computer program product, comprising a computer usable medium having a computer readable program code adapted to be executed to implement a method comprising: at a device comprising; a sensor configured to receive NFC tag identifiers from at least one near field communication (NFC) tag; and, a processor, comparing a first NFC tag identifier to a second NFC tag identifier, both the first NFC tag identifier and the second NFC tag identifier having been received by the sensor within a given time period; when the first NFC tag identifier and the second NFC tag identifier are the same, inferring that the first NFC tag identifier and the second NFC tag identifier are associated with a single NFC tag; and when the first NFC tag identifier and the second NFC tag identifier are not the same, inferring that the first NFC tag identifier and the second NFC tag identifier are associated with two different NFC tags. The computer usable medium can comprise a non-transitory computer usable medium.

Figure 1:
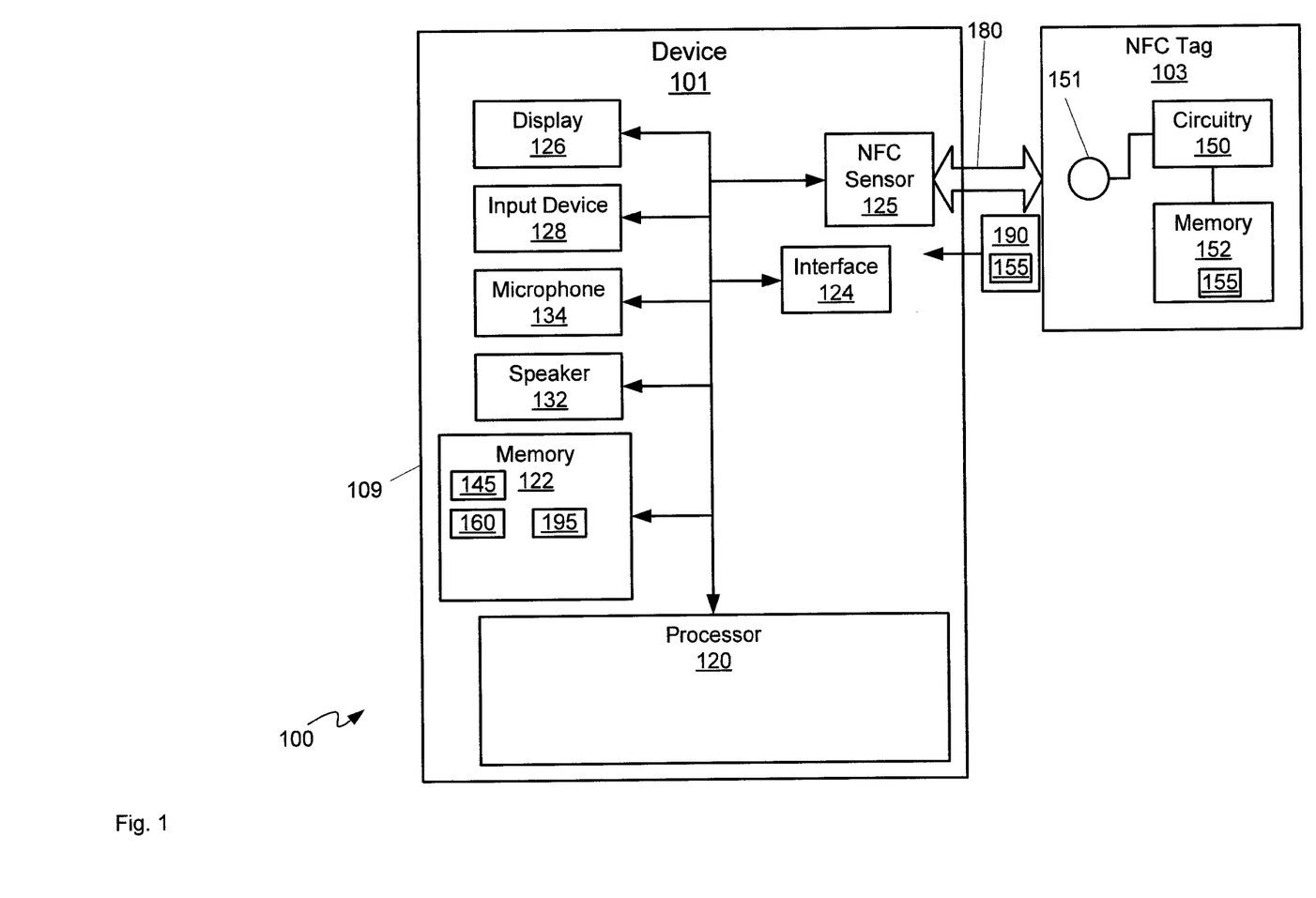
FIG. 1 depicts a schematic diagram of a system that includes a near field communication (NFC) tag and a device for determining redundancies in NFC tag detection, according to non-limiting implementations.

FIG. 1 depicts a system 100 that includes a device 101 and at least one NFC tag 103. Device 101 is generally configured to determine redundancies in near field communication tag detection, for example when detecting NFC tag 103, according to non-limiting implementations. Device 101 comprises a housing 109, which houses a processor 120 interconnected with a memory 122, a communications interface 124, a near field communication (NFC) sensor 125 (and/or a short range RF (radio-frequency) sensor), a display 126, and an input device 128, and optionally a speaker 132, and a microphone 134. Communications interface 124 will be interchangeably referred to as interface 124. NFC sensor 125 will be interchangeably referred to hereafter as sensor 125. Sensor 125 is generally configured to receive NFC tag identifiers from NFC tags, including, but not limited to, at least one NFC tag 103. Processor 120 is generally configured to: compare a first NFC tag identifier to a second NFC tag identifier, both the first NFC tag identifier and the second NFC tag identifier having been received by sensor 125 within a given time period; when the first NFC tag identifier and the second NFC tag identifier are the same, infer that the first NFC tag identifier and the second NFC tag identifier are associated with a single NFC tag; and when the first NFC tag identifier and the second NFC tag identifier are not the same, infer that the first NFC tag identifier and the second NFC tag identifier are associated with two different NFC tags.

NFC tag 103 generally comprises NFC circuitry 150, interconnected with an NFC antenna 151 and a memory 152 storing an NFC tag identifier 155. NFC tag identifier 155 generally comprises data which one or more of identifies, uniquely identifies, and almost uniquely identifies NFC tag 103. NFC tag identifier 155 can be stored at NFC tag 103 at a factory and/or when NFC tag 103 is being provisioned, NFC tag identifier 155 being generated using an algorithm for generating NFC tag identifiers. While not every NFC tag identifier of NFC tag 103 can be unique, algorithms are used that generally attempt to avoid NFC tag identifier collisions, so that chances of generating the same NFC tag identifier are small and/or almost unique. In some implementations, NFC tag identifier 155 can comprise content stored at NFC tag 103, including, but not limited to, information related to advertising and/or a product, such as an item of clothing, an entertainment event, a food product and the like which can be purchased by a user of a device 101 and/or recorded as an inventory item. In other words, in these implementations, NFC tag identifier 155 may not be specifically generated by an algorithm for generating NFC tag identifiers; rather, it is assumed that content stored at memory 152 identifies NFC tag 103.

Bringing NFC sensor 125 and NFC tag 103 "close enough" together, for example by moving NFC sensor 125 and NFC tag 103 physically towards each other into very close proximity, or into actual physical contact, can provide an operationally easy interface to set up, and initiate a wireless NFC connection 180. For example, each of NFC sensor 125 and NFC tag 103 comprise induction devices and/or antennas, such as antenna 151, for communicating and/or transmitting RF signals using induction. Detection of NFC sensor 125 and NFC tag 103 by each other, via induction, can trigger execution of an NFC query and authorization process using connection 180 and, upon optional authorization, establishment of a uni- or bi-directional wireless communication session between NFC sensor 125 and NFC tag 103. Further, power can be transferred, within connection 180, from NFC sensor 125 to NFC tag 103, via induction, to power circuitry 150 at NFC tag 103.

The NFC sensor 125 and NFC tag 103 can be aligned and/or matched in a single touch, or other gesture adapted to bring the devices into suitably close proximity (sometimes termed a "kiss" gesture, and/or a "tap" gesture because the NFC sensor 125 and NFC tag 103 typically touch and/or "kiss" and/or "tap" each other or are very close and in adjacent proximity). A non-limiting example of a suitable proximity for such implementations may be in the range of about 10 to about 20 mm, and/or less than about 20 mm, but the range may be more or less depending on the strength of an RF field generated by NFC sensor 125 and the purposes for which the NFC sensor 125 and NFC tag 103 and/or system 100 is intended.

In general, connection 180 is established when an NFC antenna (not depicted) at sensor 125 is aligned with NFC antenna 151 at NFC tag 103, as illustrated in FIG. 1. Using induction one, or both, of NFC sensor 125 and NFC tag 103 causes a voltage variation, or other signal, to be generated, transmitted to processor 120 and/or corresponding NFC circuitry 150 at NFC tag 103, so as to activate NFC circuitry 150 to communicate with the other device using the protocol of an associated NFC Stack or other wireless communication(s) subsystem or device(s). The NFC sensor 125 and NFC tag 103 can then communicate with each other using any NFC protocol suitable for the intended purpose.

Establishment of NFC communications sessions between NFC sensor 125 and NFC tag 103 can be optionally conditioned on suitably-adapted authorizations, using, for example, PIN numbers and/or other security keys.

Interaction between active NFC sensor 125 and NFC tag 103 as shown, for example, in FIG. 1, can be considered peer-to-peer NFC interactions.

Detection of NFC tag 103 by NFC sensor 125 (and/or device 101) can also activate or change functionality of device 101. For example, detection of NFC tag 103 can cause device 101 to enter a different mode than before NFC tag 103 was detected, where some functionality is turned on, and other functionality is turned off. Hence, in these scenarios, accurate detection of NFC tag 103 can be critical, especially when there is an expectation on the part of a user of device 101 that detection of NFC tag 103 will cause device 101 to change functionality, for example, to either provide data regarding NFC tag 103 at display 126 and/or enter a mode that device 101 is programmed to enter upon detection of NFC tag 103.

It is appreciated that FIG. 1 further depicts a schematic diagram of device 101, which will be hereafter be described in further detail. It should be emphasized that the structure of device 101 in FIG. 1 is purely an example. For example, as depicted in FIG. 1, it is contemplated that device 101 comprises a device that can be used for implementing both wireless voice (e.g. telephony) and wireless data communications (e.g. email, web browsing, text, and the like), as well as any other specialized functions, including, but not limited, to one or more of, computing, and/or entertainment related functions. In particular, in some implementations, device 101 can comprise a dedicated NFC reader, used for one or more of commercial transactions, inventory solutions and the like.

Housing 109 can comprise any housing, casing, and the like. It is appreciated that device 101 can be portable (readily movable from place to place) and, in some implementations, device 101 can be handheld (sized and shaped to be held or carried in a human hand, and typically used while so held or carried); hence, housing 109 can be configured for a type of device 101. In general, housing 109 encloses or houses the components of device 101; however some components can be visible via apertures, windows and the like in housing 109. For example, display 126 is generally visible.

At least one input device 128 is generally configured to receive input data, and can comprise any suitable combination of input devices, including but not limited to a keyboard, a keypad, a pointing device, a mouse, a track wheel, a trackball, a touchpad, a touch screen and the like. Other input devices are within the scope of present implementations.

Input from input device 128 is received at processor 120 (which can be implemented as a plurality of processors, including but not limited to one or more central processors (CPUs)). Processor 120 is configured to communicate with a memory 122 comprising a non-volatile storage unit (e.g. Erasable Electronic Programmable Read Only Memory ("EEPROM"), Flash Memory, and the like) and a volatile storage unit (e.g. random access memory ("RAM"), and the like). Programming instructions that implement the functional teachings of device 101 as described herein are typically maintained, persistently, in memory 122 and used by processor 120 which makes appropriate utilization of volatile storage during the execution of such programming instructions. In some implementations, processor 120 comprises at least a portion of memory 122, for example as on-board random access memory (RAM). It is further appreciated that memory 122 is an example of computer readable media that can store programming instructions executable on processor 120. Furthermore, memory 122 is also an example of a memory unit and/or memory module.

In particular, it is appreciated that memory 122 stores application 145, that, when processed by processor 120, enables processor 120 to: compare a first NFC tag identifier to a second NFC tag identifier, both the first NFC tag identifier and the second NFC tag identifier having been received by sensor 125 within a given time period; when the first NFC tag identifier and the second NFC tag identifier are the same, infer that the first NFC tag identifier and the second NFC tag identifier are associated with a single NFC tag; and when the first NFC tag identifier and the second NFC tag identifier are not the same, infer that the first NFC tag identifier and the second NFC tag identifier are associated with two different NFC tags.

Furthermore, the term "given time period" is appreciated to refer to a particular time period and/or a time period of significance; a given time period can also be generally predetermined and/or configured at device 101 by storing the given time period at memory 122 either within application 145 and/or separate from application 145. For example, as depicted, memory 122 stores data 160 corresponding to a given time period at memory 122. In specific non-limiting implementations, the given time period can be one or more of: between about 0.5 seconds and about 2 seconds; and, less than about 2 seconds. In particular the given time period can be about 1 second. In general, the given time period can comprise a few interrogation cycles of sensor 125, i.e. an amount of time sensor 125 takes to interrogate and/or read data 190 from NFC tag 103.

It is further appreciated that memory 122 can be configured to store at least one NFC tag identifier 195 from an NFC tag that was previously read by sensor 125 including, but not limited to, NFC tag identifier 155 of NFC tag 103. In other words, it is assumed in FIG. 1, that an NFC tag identifier 195 was previously received at sensor 125, for example, in connection 180 and/or in another communication session with another NFC tag (not depicted). When NFC tag identifier 195 was received in connection 180, then NFC tag identifier 195 can comprise NFC tag identifier 155: in other words, in these implementations, sensor 105 has "read" NFC tag 103 twice. In general, NFC tag identifier 195 comprises a last received NFC tag identifier.

Processor 120 can be further configured to communicate with display 126, and optional microphone 134 and optional speaker 132. Display 126 comprises one or more of a flat panel display, an LCD (liquid crystal display), a plasma display, an OLED (organic light emitting diode) display, a capacitive touchscreen, a resistive touch screen, a CRT (cathode ray tube) display, and the like. Optional microphone 134 comprises a microphone for receiving sound data at device 101. Optional speaker 132 comprises a speaker for providing sound data, audible alerts, audible communications from remote communication devices, and the like, at device 101. Processor 120 can also control one or more of display 126 and optional speaker 132 to provide notifications. In some implementations, device 101 can further comprise an indicator and/or notification device (not depicted), for example an LED (light emitting diode), a light and the like that can also be configured to provide notifications.

Processor 120 can be further configured to communicate with NFC sensor 125 which is configured to wirelessly communicate with at least one NFC tag 103, as described above. While not depicted, NFC sensor 125 can comprise an NFC antenna, similar to antenna 151, and hence, in these implementations, NFC sensor 125 comprises an NFC interface for wirelessly transmitting and receiving NFC signals via an NFC antenna. Indeed, in general, NFC sensor 125 can include, but is not limited to; an induction based wireless reader, a short range RF reader, an NFC reader, an NFC antenna, a RFID (radio-frequency identifier) reader, and the like. In other words, while the term "NFC" can refer to a specific standard, present implementations are not so limited, and a device 101 can include any short range RF reader configured to detect corresponding short range RF tags.

Interface 124 (and/or another communications interface, not depicted) can be implemented as one or more radios and/or connectors and/or network adaptors, configured to wirelessly communicate with one or more communication networks (not depicted) and/or wireless communication networks and/or wired communication networks and/or wireless transceivers. It will be appreciated that, in these implementations, interface 124 can be configured to correspond with network architecture that is used to implement one or more communication links to the one or more communication networks, including but not limited to any suitable combination of USB (universal serial bus) cables, serial cables, wireless links, cell-phone links, cellular network links (including but not limited to 2G, 2.5G, 3G, 4G+, UMTS (Universal Mobile Telecommunications System), CDMA (Code division multiple access), WCDMA (Wideband CDMA), FDD (frequency division duplexing), TDD (time division duplexing), TDD-LTE (TDD-Long Term Evolution), TD-SCDMA (Time Division Synchronous Code Division Multiple Access) and the like, wireless data Bluetooth ™ links, NFC (near field communication) links, WiFi links, WiMax links, packet based links, the Internet, analog networks, the PSTN (public switched telephone network), access points, and the like, and/or a combination. When interface 124 is configured to communicate with one or more communication networks, interface 124 can comprise further protocol specific antennas therefor (not depicted). In some implementations, however, interface 124 can be optional.

While not depicted, it is yet further appreciated that device 101 comprises a battery and/or a power pack, or any other suitable power source.

In any event, it should be understood that a wide variety of configurations for device 101 are contemplated.

At least one NFC tag 103 can comprise an active device, which can be actively powered by a battery and the like, or a passive device which is battery-less. Circuitry 150 can include, but is not limited to, an NFC chip, such as a memory-based chip or a processor-based chip. Circuitry 150 can be adapted to carry out actions necessary for communication using an NFC protocol including but not limited to modulation, demodulation, encoding and decoding. Suitable circuitry 150 can include, but is not limited to, NFC chips that use MIFARE® technology from Koninklijke Philips Electronics N.Y. of the Netherlands and NFC chips using FeliCa™ technology from Sony Corporation of Japan. Further, NFC tag 103 can be embedded in a poster or any other device, apparatus or structure.

NFC antenna 151 can, in some implementations, be tuned for 13.56MHz, and a corresponding antenna at sensor 125 can be tuned to the same frequency. However, other frequencies are in the scope of present implementations, and can depend on the technology implemented at each of NFC tag 103 and sensor 125. In general, each of NFC antenna 151 and an antenna at sensor 125 are tuned to the same frequency.

Further sensor 125 and NFC tag 103 are generally compatible so that each of sensor 125 and NFC tag 103 are configured with similar technologies and/or protocols and/or standards.

In general, NFC tag 103 can include, but is not limited to, an induction based wireless tag, a short range RF tag, an NFC tag, an NFC antenna, an RFID (radio-frequency identifier) tag, and the like. In other words, while the term "NFC" can refer to a specific standard, present implementations are not so limited, and a NFC tag 103 can include any short range RF tag configured to communicate with corresponding short range RF sensors.

Memory 152 can include both volatile and persistent (i.e., non-transient) media for storing data 190 readable by sensor 125. Data 190 stored by NFC tag 103 can be read by sensor 125, and can include any data suitable for a desired purpose, including, but not limited to, NFC tag identifier 155. For example, when NFC tag 103 is affixed to an informational document such as an advertising or instructional poster, an inventory item, and the like, NFC tag 103 can store any information at data 190 desired to be imparted to sensor 125, device 101 and/or users thereof. For example, when NFC tag 103 is affixed to an advertising poster, a product and the like, memory 152 can store information related to advertising and/or the product, such as an item of clothing, an entertainment event, a food product and the like which can be purchased by a user of a device 101 and/or recorded as an inventory item. Such information related to a product and the like can be stored at memory 152 in addition to NFC tag identifier 155. However, in other implementations, NFC tag identifier 155 can comprise information and/or content stored at NFC tag 103, including, but not limited to, information related to advertising and/or a product, such as an item of clothing, an entertainment event, a food product and the like which can be purchased by a user of a device 101 and/or recorded as an inventory item. In other words, in these implementations, NFC tag identifier 155 may not be specifically generated by an algorithm for generating NFC tag identifiers; rather, it is assumed that content stored at memory 152 identifies NFC tag 103.

Alternatively, or in addition, memory 152 can store information at data 190 such as a uniform resource locator (URL) or other network address information, such as a telephone number, readable by sensor 125, and suitable for directing processor 120 to establish one or more uni- or multi-direction communications sessions with commonly-controlled and/or third-party resources via a communication network (not depicted) using interface 124. In some implementations, NFC tag identifier 155 can comprise the stored network address and/or URL.

In any event, sensor 125 "reads" data 190 from NFC tag 103 in connection 180. For example, data 190 comprising NFC tag identifier 155 is wirelessly transmitted by NFC tag 103 to sensor 125 using connection 180; one or more of data 190 and NFC tag identifier 155 can then be processed by processor 120. Data 190 can include any other data stored at memory 122, for example the aforementioned product information, event information, address information and the like. Data 190 is generally transmitted when connection 180 is established and/or when NFC tag 103 has received enough power in connection 180 to transmit data 190.

Figure 2:
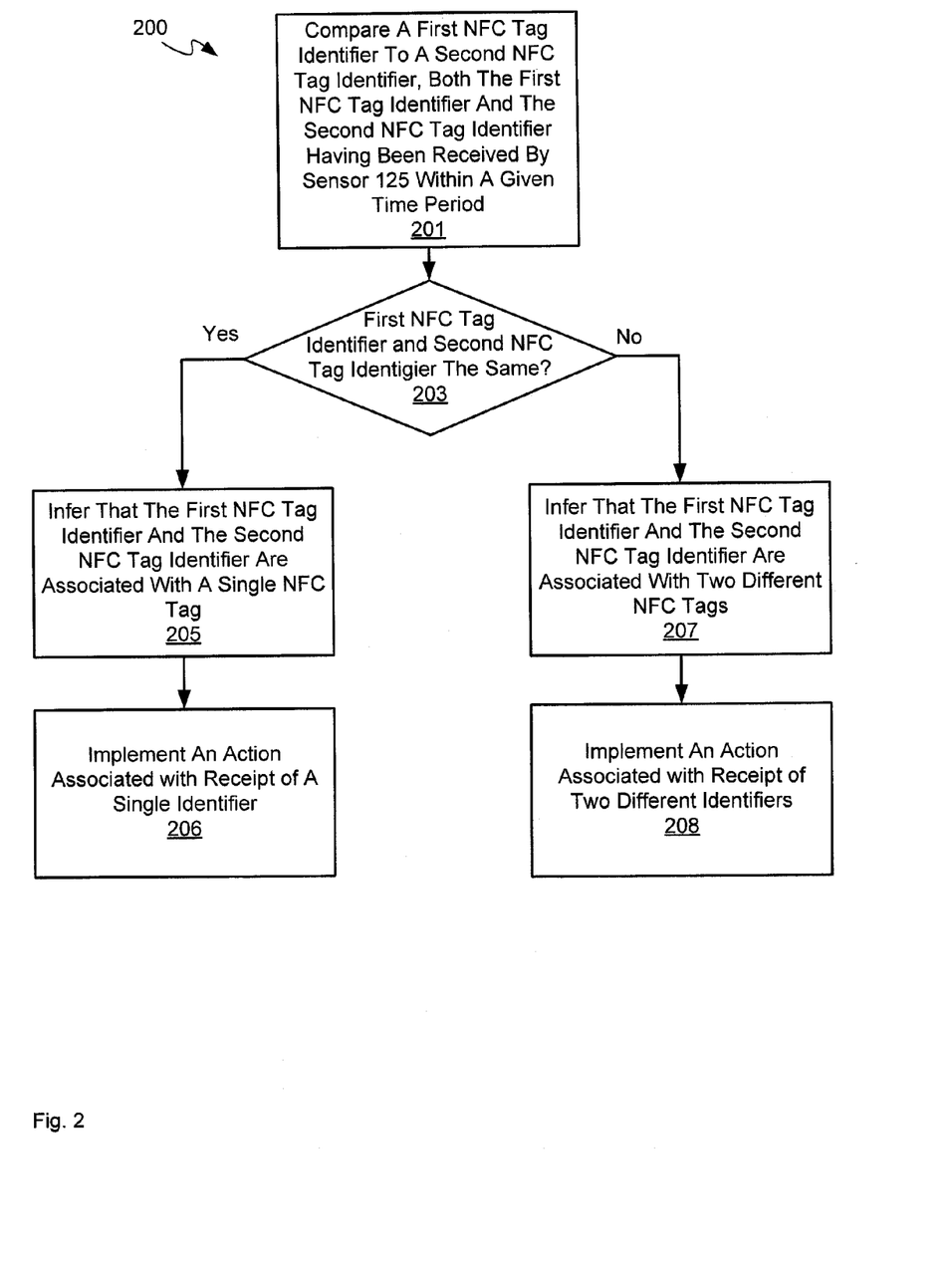
FIG. 2 depicts a flowchart of a method for determining redundancies in NFC tag detection, according to non-limiting implementations.

Attention is now directed to FIG. 2 which depicts a flowchart illustrating a method 200 for determining redundancies in near field communication tag detection, according to non-limiting implementations. In order to assist in the explanation of method 200, it will be assumed that method 200 is performed using device 101. Furthermore, the following discussion of method 200 will lead to a further understanding of device 101 and its various components. However, it is to be understood that device 101, and/or method 200 can be varied, and need not work exactly as discussed herein in conjunction with each other, and that such variations are within the scope of present implementations. It is appreciated that, in some implementations, method 200 is implemented in device 101 by processor 120, for example by implementing application 145.

It is to be emphasized, however, that method 200 need not be performed in the exact sequence as shown, unless otherwise indicated; and likewise various blocks may be performed in parallel rather than in sequence; hence the elements of method 200 are referred to herein as "blocks" rather than "steps". It is also to be understood that method 200 can be implemented on variations of device 101 as well.

It is further assumed in method 200 that device 101 has received NFC tag identifier 155 from NFC tag 103 in connection 180 as described above.

At block 201, processor 120 compares a first NFC tag identifier to a second NFC tag identifier, both the first NFC tag identifier and the second NFC tag identifier having been received by sensor 125 within a given time period, for example, NFC tag identifiers 155, 195, and given time period stored in data 160. As described above, NFC tag identifier 195 is a last received NFC tag identifier and NFC tag identifier 155 is a currently received NFC tag identifier.

At block 203, processor 120 determines whether the first NFC tag identifier 155 and the second NFC tag identifier 195 are the same.

When first NFC tag identifier 155 and second NFC tag identifier 195 are the same (i.e. a "Yes" decision at block 203), at block 205, processor 120 infers that first NFC tag identifier 155 and second NFC tag identifier 195 are associated with a single NFC tag, for example NFC tag 103. At block 206, processor 120 can implement an action associated with receipt of a single NFC tag identifier (i.e. NFC tag identifier 155) including, but not limited to, providing one notification of detecting the given NFC tag (i.e. NFC tag 103) rather than two notifications, turning on some functionality and/or turning off other functionality, implementing a commercial action, implementing an inventory action, transmitting data received with NFC tag identifier 155 to a network address, retrieving data from network address received with NFC tag identifier 155, and the like.

Returning to block 203, when first NFC tag identifier 155 and second NFC tag identifier 195 are not the same (i.e. a "No" decision at block 203), at block 207, processor 120 infers that first NFC tag identifier 155 and second NFC tag identifier 195 are associated with two different NFC tags. At block 208, processor 120 can implement an action associated with receipt of two different NFC tag identifiers (i.e. NFC tag identifiers 155, 195) including, but not limited to, providing respective notifications of detecting each of two different NFC tags (i.e. NFC tag 103 and another NFC tag from which NFC tag identifier 195 was received) corresponding to each of the two NFC tag identifiers (i.e. NFC tag identifiers 155, 195), turning on some functionality and/or turning off other functionality corresponding to each NFC tag identifier 155, 195, implementing respective commercial actions corresponding to each NFC tag identifier 155, 195, implementing respective inventory actions corresponding to each NFC tag identifier 155, 195, transmitting respective data received with each NFC tag identifier 155, 195 to respective network addresses, retrieving respective data from respective network address received with each NFC tag identifier 155, 195 and the like.

While not shown in FIG. 2, it is further appreciated that when two NFC tag identifiers are received in a time period greater than the given time period, regardless of whether the two NFC tag identifiers are the same or different, processor 120 implements actions respective to two NFC tag detections. When the same NFC tag 103 is detected twice in a time period greater than the given time period, processor 120 can implement actions associated with each detection of NFC tag 103. When two different NFC tags are detected twice in a time period greater than the given time period, processor 120 can implement actions associated with each detected NFC tag.

Non-limiting examples of method 200 will be described hereafter with respect to FIGS. 3 to 9, each of which is similar to FIG. 1, with like elements having like numbers.

Figure 3:
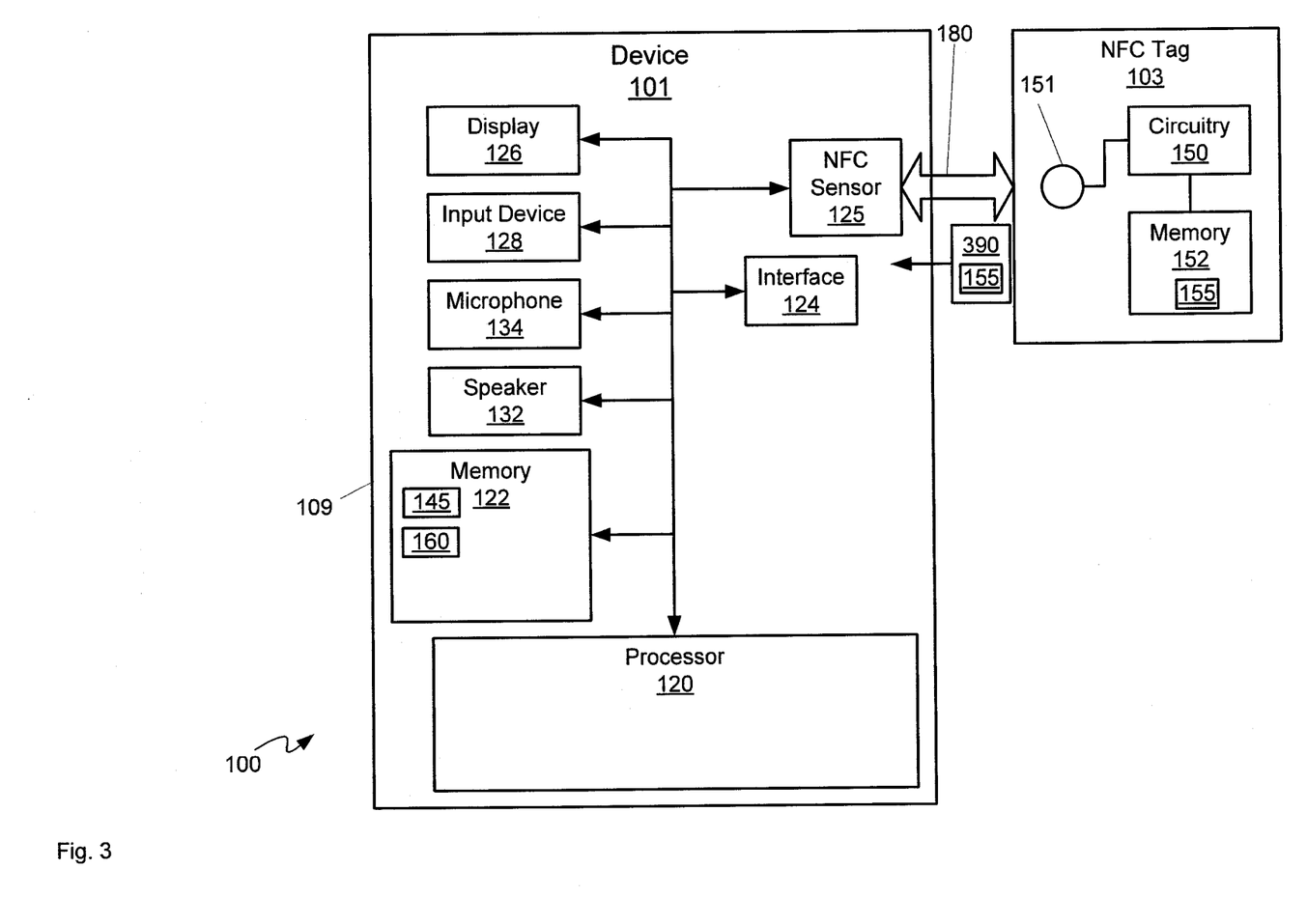
FIG. 3 depicts the device of FIG. 1 initially receiving an identifier from the NFC tag, according to non-limiting implementations.

Attention is next directed to FIG. 3, in which NFC tag identifier 195 has not yet been stored at memory 122. Further, sensor 125 is receiving data 390 from NFC tag 103 in connection 180, data 390 similar to data 190, data 390 including NFC tag identifier 155.

Figure 4:
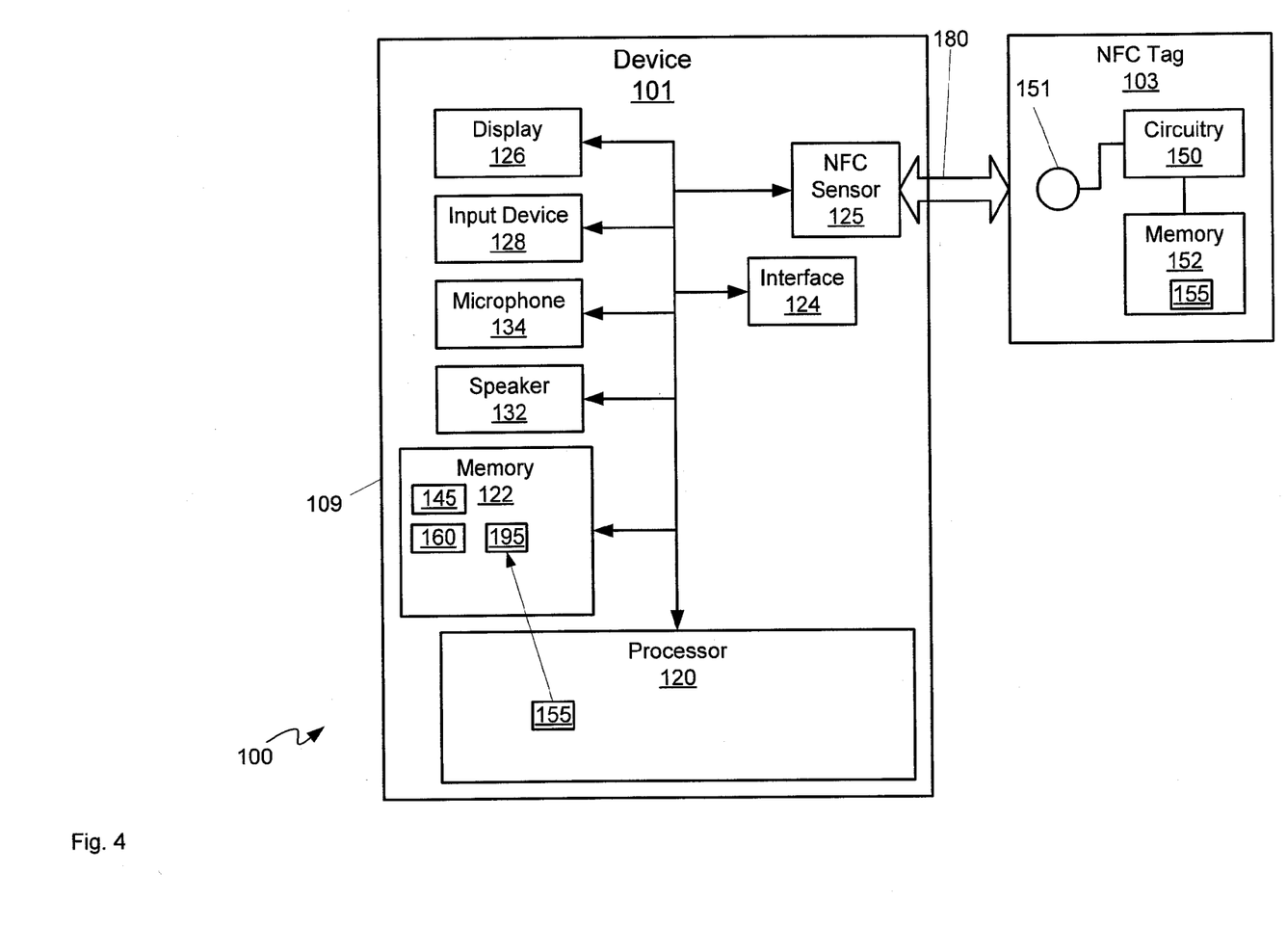
FIG. 4 depicts the device of FIG. 1 storing the received identifier of FIG. 3 at a memory as a most recently received identifier, according to non-limiting implementations.
Figure 5:
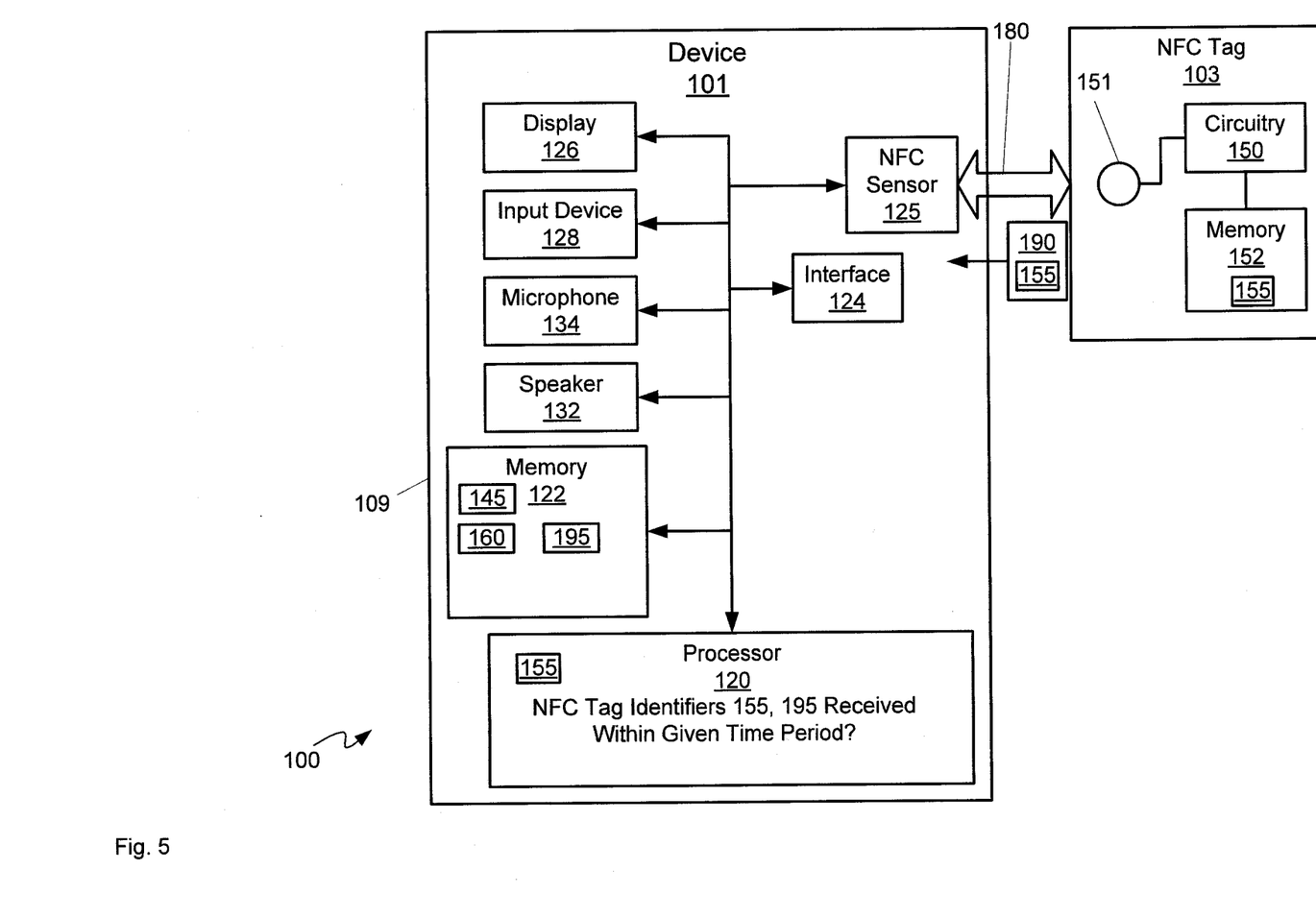
FIG. 5 depicts the device of FIG. 1 again receiving the identifier from the NFC tag, and determining whether the two identifiers were received within a given time period, according to non-limiting implementations.

In FIG. 4, processor 120 receives NFC tag identifier 155 with data 390 and stores NFC tag identifier 155 at memory 122 as NFC tag identifier 195. In other words, in these implementations, NFC tag identifier 155 and NFC tag identifier 195 are the same. NFC tag identifier 195 can be stored with a time of receipt, for example as determined from a clock at processor 120 and/or a clock device at device 101. The time of receipt can comprise a relative time of receipt and/or an absolute time of receipt (e.g. a time of day).

Further, when a first NFC tag identifier 195, of two NFC tag identifiers 155, 195, is received, processor 120 stores the first NFC tag identifier 195 at memory 122: i.e. processor 120 does not presently "know" whether another NFC tag identifier is going to be received and stores NFC tag identifier 195 in anticipation of receiving another NFC tag identifier.

Further, FIGS. 3 and 4 depict provisioning of NFC tag identifier 195 in scenarios where NFC tag identifiers 155, 195 are the same.

Figure 6:
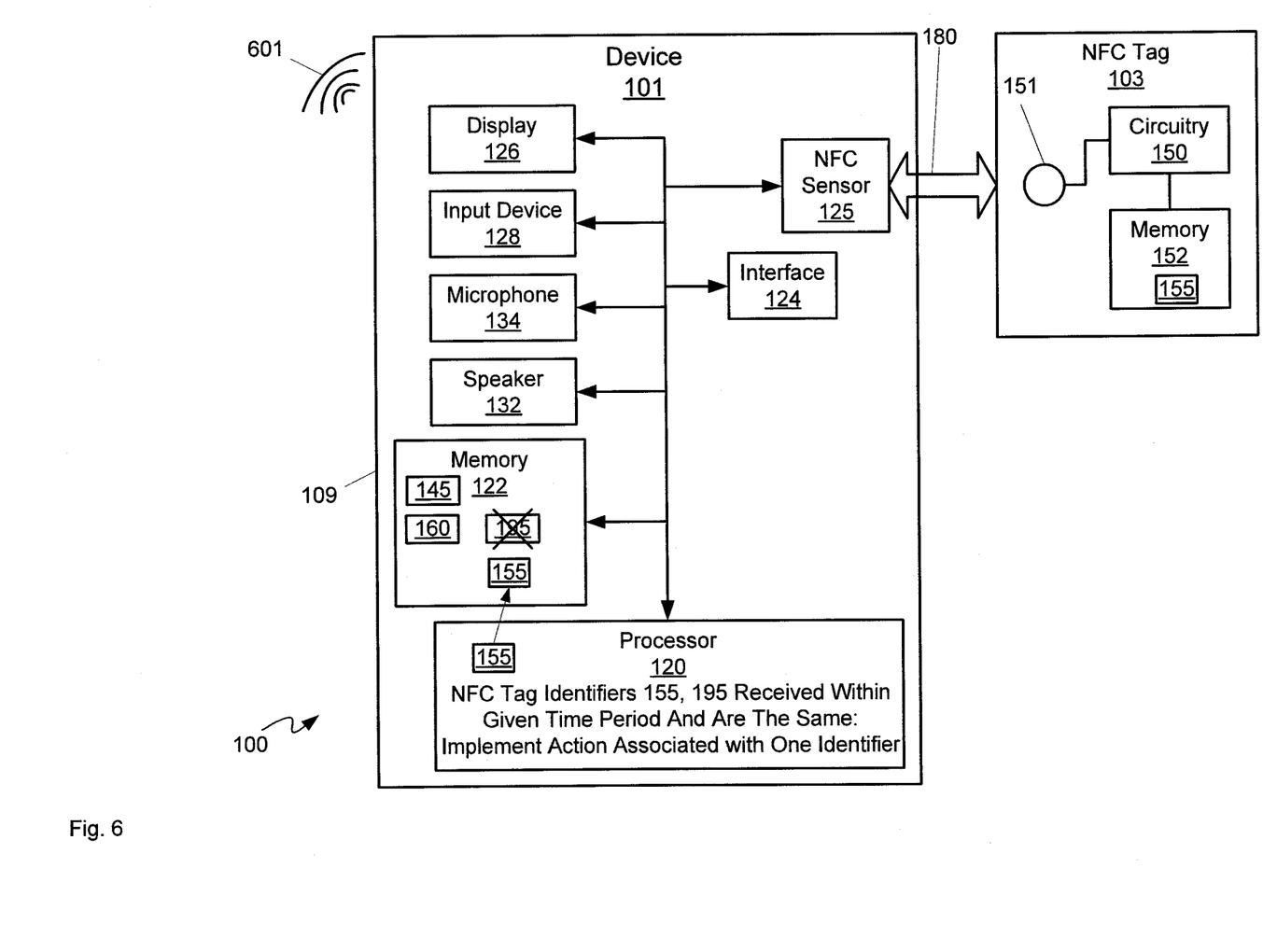
FIG. 6 depicts the device of FIG. 1 determining that the two identifiers were received within a given time period, and are the same and, in response, implementing an action associated with one identifier, according to non-limiting implementations.

In FIG. 5, sensor 125 again receives NFC tag identifier 155, as in FIG. 1, and processor 120 determines (i.e. at block 201) whether NFC tag identifiers 155, 195 are received within the given time period stored in data 160, for example by comparing a time of receipt of NFC tag identifier 155 with a time of receipt of NFC tag identifier 195. With reference to FIG. 6, when NFC tag identifiers 155, 195 are the same, and received within the given time period (i.e. a "Yes" decision at block 203), processor 120 determines that a redundant detection of NFC tag 103 has occurred (i.e. at block 205), and implements an action associated with receipt of one NFC tag identifier (i.e. at block 206), as described above, for example providing a notification 601 of one detection of NFC tag 103. Notification 601 can be provided at one or more of display 126, speaker 132, an indicator, or the like.

In some implementations, processor 120 can actively suppress a second notification of NFC tag 103. For example, notification 601 can be provided upon receipt of data 390 and/or when processor 120 determines that data 390 comprises NFC tag identifier 155; when NFC tag identifier 155 is received again (in data 190) within the given time period, a second notification of NFC tag 103 can be suppressed as processor 120 has determined that NFC tag 103 has been redundantly detected.

In implementations where NFC tag identifier 155 is received more than twice within the given time period, again only one notification of NFC tag 103 is provided, and/or actions associated with one detection of NFC tag 103 are implemented.

As depicted, processor 120 can optionally delete NFC tag identifier 195 from memory 122 and store NFC tag identifier 155 in memory 122 so that only a last received NFC tag identifier is stored in memory 122; NFC tag identifier 155 can be stored with a respective time of receipt in anticipation of receiving a further NFC tag identifier, for example in another redundant detection of NFC tag 103. In these implementations, processor 120 can then determine whether NFC tag identifier 155 is again received within the given time period starting from the last respective time or receipt of NFC tag identifier 155 and again implement method 200.

However, in some implementations, processor 120 can store NFC tag identifiers of a given number of most recently received NFC tag identifiers and compare NFC tag identifier 155 with each of the stored NFC tag identifiers. When consecutive matches occur (i.e. NFC tag identifier 155 is the same as the most recently received NFC tag identifiers that have been received consecutively), and when times of receipt between consecutive NFC tag identifiers are each less than the given time period, and when a notification of NFC tag 103 identified by NFC tag identifier 155 has already occurred, and/or actions associated therewith, (e.g. when NFC tag identifier 155 was first received), no further notifications and/or actions occur in association with a current receipt of NFC tag identifier 155.

Figure 7:
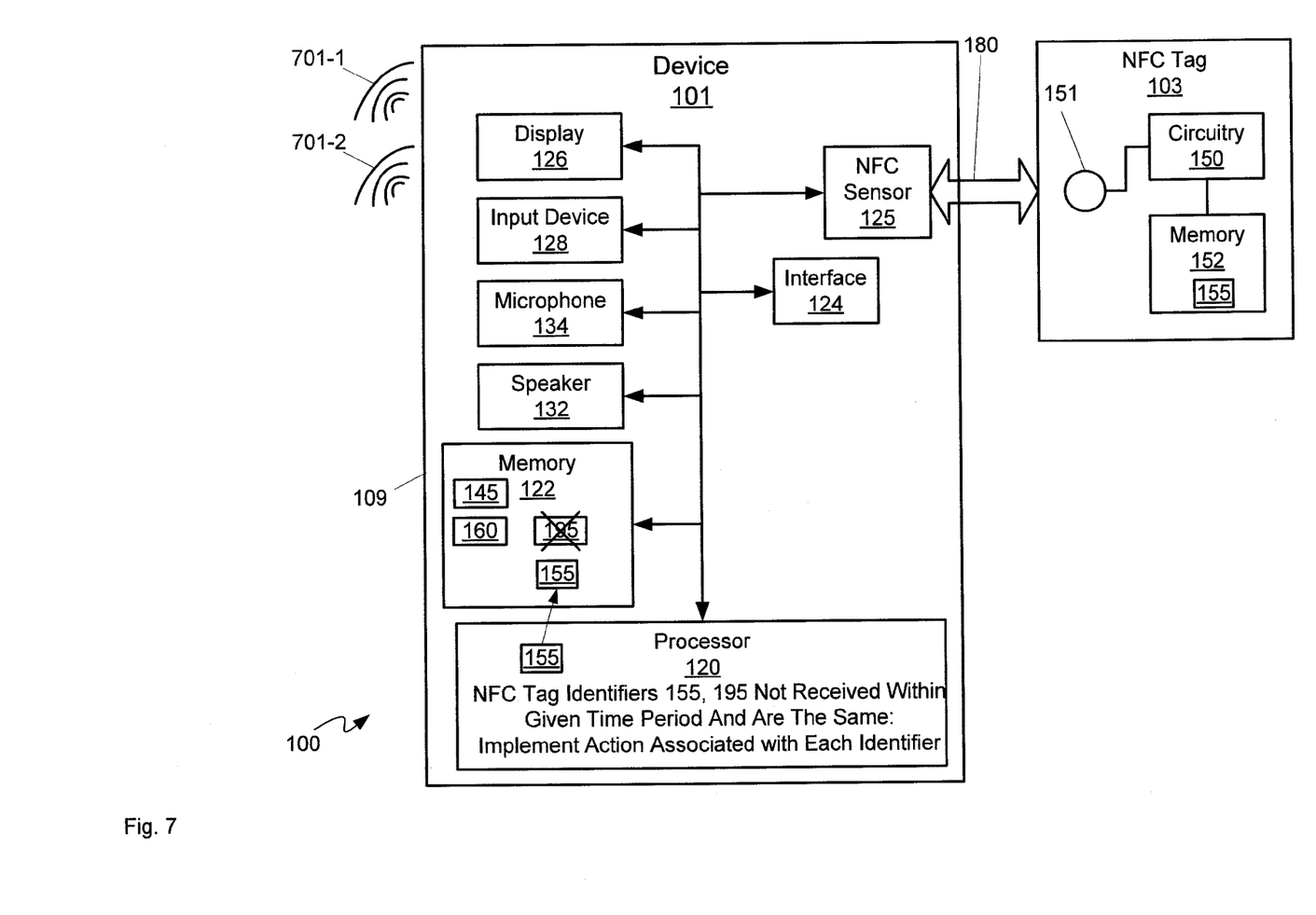
FIG. 7 depicts the device of FIG. 1 determining that the two identifiers were received not within a given time period, and are the same and, in response, implementing actions associated with receipt of two identifiers, according to non-limiting implementations.

With reference to FIG. 7, when NFC tag identifiers 155, 195 are the same, but are received in a time period greater than the given time period, processor 120 can determine that given NFC tag 103 has been detected twice, and that a redundant detection of given NFC tag 103 has not occurred. Processor 120 can hence implement a respective action associated with receipt of two NFC tag identifiers, for example providing a respective notification 701-1, 701-2 of each detection of NFC tag 103. Notifications 701-1, 701-2 can be provided at one or more of display 126, speaker 132, an indicator, or the like. A given notification 701-1, 701-2 can be provided upon a respective receipt of NFC tag identifier 155, for example in each of data 390 and data 190.

Processor 120 can optionally delete NFC tag identifier 195 from memory 122 and store NFC tag identifier 155 in memory 122 so that only a last received NFC tag identifier is stored in memory 122; NFC tag identifier 155 can be stored with a respective time of receipt. Alternatively, processor 120 can store a given number of most recently received NFC tag identifiers.

However, once NFC tag identifier 195 is stored, processor 120 can optionally determine that a time period greater than the given time period has passed, and when a second NFC tag identifier 155, of the two NFC tag identifiers 155, 195, is not received within the given time period, processor 120 can delete the first NFC tag identifier 195 from memory 122.

Figure 8:
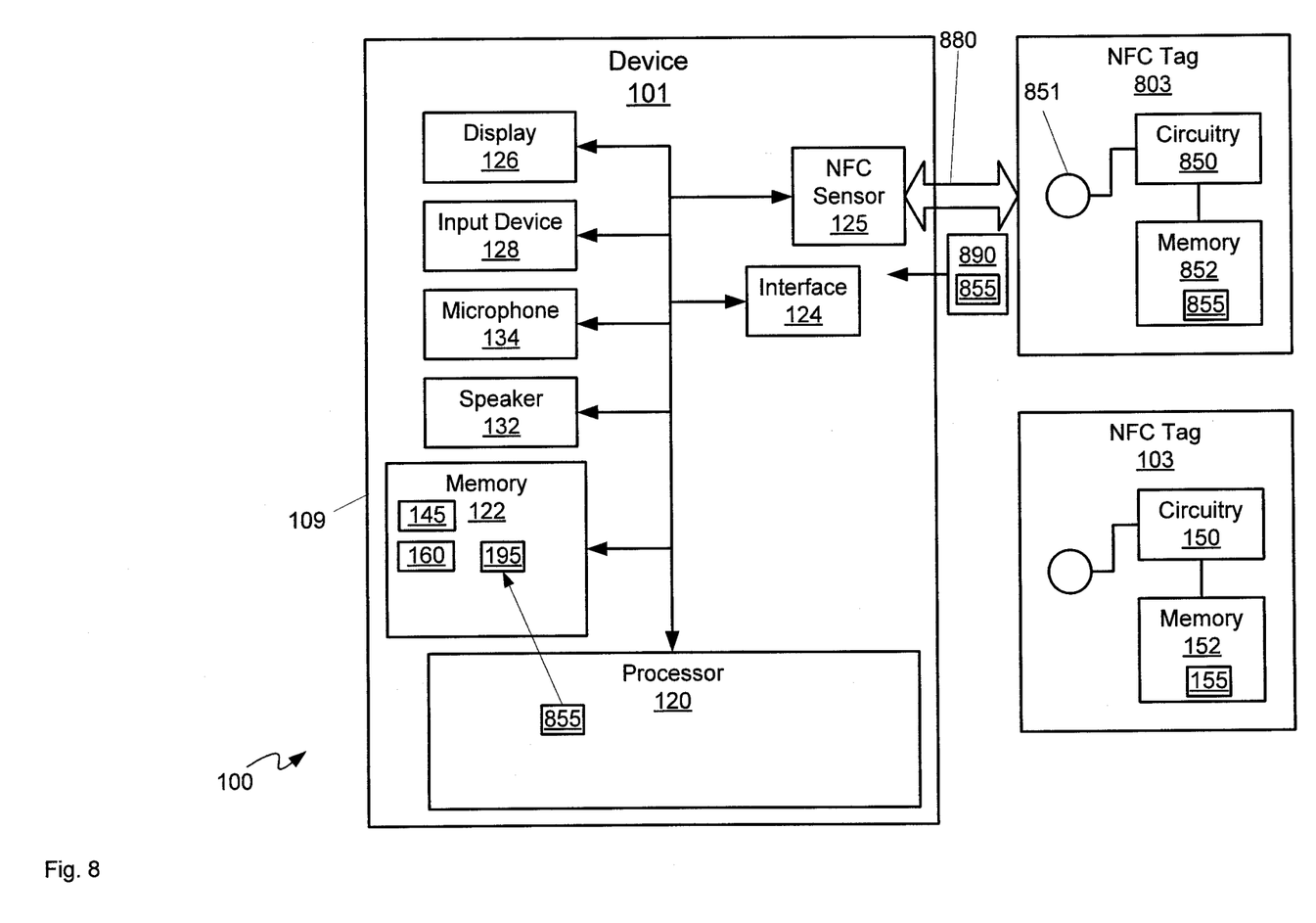
FIG. 8 depicts the device of FIG. 1 initially receiving an identifier from a first NFC tag of two NFC tags, according to non-limiting implementations.

Attention is next directed to FIG. 8, which depicts sensor 125 in communication with a second NFC tag 803, which is substantially similar to NFC tag 103, with like elements having like numbers, but preceded by an "8" rather than a "1". Hence, NFC tag 803 comprises circuitry 850 interconnected with an antenna 851 and a memory 852 storing an NFC tag identifier 855 different from NFC tag identifier 155. In FIG. 8, sensor 125 has been placed proximal NFC tag 803 so that a connection 880, similar to connection 180, has been established between sensor 125 and NFC tag 803. NFC tag 803 then transmits data 890, similar to data 190, to sensor 125, data 890 comprising NFC tag identifier 855. Processor 120 processes data 890 and stores NFC tag identifier 855 in memory 122 as NFC tag identifier 195, a most recently received NFC tag identifier, as described above.

Hence, FIG. 8 depicts provisioning of NFC tag identifier 195 in scenarios where NFC tag identifiers 155, 195 are different, as described hereafter.

Figure 9:
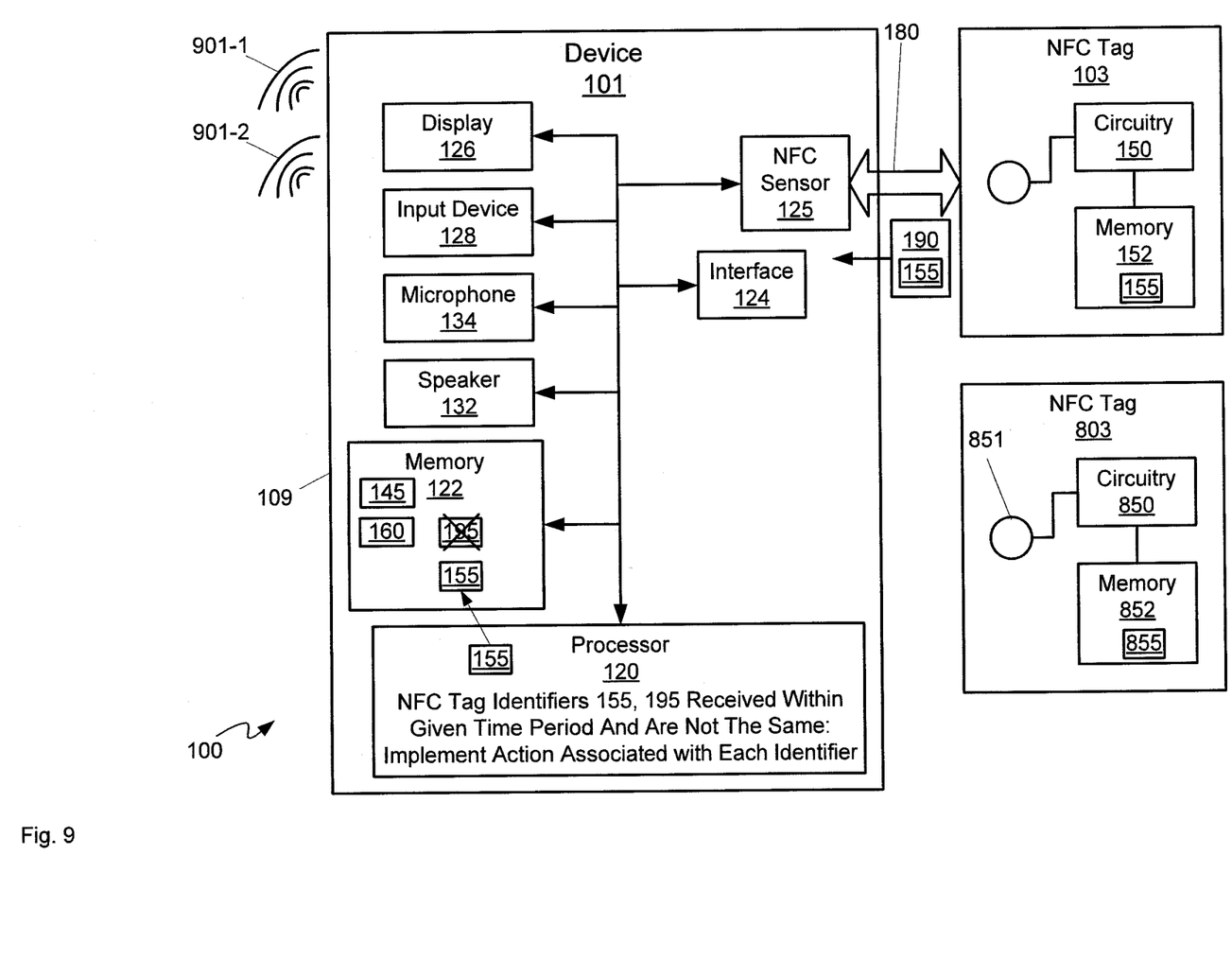
FIG. 9 depicts the device of FIG. 1 initially receiving another identifier from a second NFC tag of the two NFC tags, determining that the two identifiers were received within a given time period, and are not the same and, in response, implementing actions associated with receipt of two identifiers, according to non-limiting implementations.

Next, with reference to FIG. 9, device 101 is moved proximal to NFC tag 103 and/or NFC tag 103 is moved proximal to device 101, so that connection 180 is established, as described above, where data 190 is received including NFC tag identifier 155. Assuming that NFC tag identifier 155 and NFC tag identifier 195 (i.e. NFC tag identifier 855) are received within the given time period, NFC tag identifier 155 is compared to NFC tag identifier 195 (i.e. at block 201) and, in these implementations, processor 120 determines that they are not the same (i.e. a "No" decision at block 203). Hence, processor 120 determines that two different NFC tags 103, 803 have been detected (i.e. at block 207), and implements an action associated with receipt of two NFC tag identifiers (i.e. at block 208). For example, when the two NFC tag identifiers 155, 195 are not the same, processor 120 can provide respective notifications 901-1, 901-2 of detecting each of two different NFC tags 103, 803 corresponding to each of the two NFC tag identifiers 155, 195.

Processor 120 can optionally delete NFC tag identifier 195 from memory 122 and store NFC tag identifier 155 in memory 122 so that only a last received NFC tag identifier is stored in memory 122; NFC tag identifier 155 can be stored with a respective time of receipt.

While it is appreciated that the methods described herein could also be used with non-portable devices, the methods may be especially advantageous for mobile electronic devices that are handheld and readily moveable between NFC tags. In particular, hand held devices can be quickly movable between NFC tags, for example in inventory situations and the like, and/or in commercial transactions and the like, and/or in any other type of NFC tag detection scenario. Implementation of one or more embodiments may realize one or more additional benefits as well, such as flexibility of implementation. Further, this disclosure can be adapted to a variety of mobile electronic devices.

Those skilled in the art will appreciate that in some implementations, the functionality of device 101 can be implemented using pre-programmed hardware or firmware elements (e.g., application specific integrated circuits (ASICs), electrically erasable programmable read-only memories (EEPROMs), etc.), or other related components. In other implementations, the functionality of device 101 can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever.

Persons skilled in the art will appreciate that there are yet more alternative implementations and modifications possible, and that the above examples are only illustrations of one or more implementations. The scope, therefore, is only to be limited by the claims appended hereto.

The invention claimed is:

1. A device comprising:
   a sensor configured to receive NFC tag identifiers from at least one near field communication (NFC) tag;
   a notification device configured to provide notifications, the notification device comprising one or more of a display device, a speaker, an LED (light emitting diode), and a light; and,
   a processor configured to:
      compare a first NFC tag identifier to a second NFC tag identifier, both the first NFC tag identifier and the second NFC tag identifier having been received by the sensor within a given time period, the given time period comprising an amount of time the sensor takes to one or more of interrogate and read data from NFC tags;
      when the first NFC tag identifier and the second NFC tag identifier are the same, infer that the first NFC tag identifier and the second NFC tag identifier are associated with a single NFC tag, and control the notification device to provide one notification of detecting the single NFC tag, the one notification provided after the first NFC tag identifier and the second NFC tag identifier are received and after determining that the first NFC tag identifier and the second NFC tag identifier are the same; and
      when the first NFC tag identifier and the second NFC tag identifier are not the same, infer that the first NFC tag identifier and the second NFC tag identifier are associated with two different NFC tags, and control the notification device to provide respective notifications of detecting each of the first NFC tag identifier and the second NFC tag identifier, the respective notifications provided after the first NFC tag identifier and the second NFC tag identifier are received and after determining that the first NFC tag identifier and the second NFC tag identifier are different.

2. The device of claim 1, further comprising a memory configured to store the NFC tag identifiers from the at least one NFC tag.

3. The device of claim 2, wherein the processor is further configured to: when the first NFC tag identifier is received, store the first NFC tag identifier at the memory.

4. The device of claim 3, wherein the processor is further configured to: when the second NFC tag identifier is not received within the given time period, delete the first NFC tag identifier from the memory.

5. The device of claim 1, wherein the given time period is one or more of: between about 0.5 seconds and about 2 seconds; and, less than about 2 seconds.

6. The device of claim 1, wherein the processor is further configured to: when the first NFC tag identifier and the second NFC tag identifier are the same implement an action associated with receipt of a single NFC tag identifier; and when the first NFC tag identifier and the second NFC tag identifier are not the same, implement an action associated with the receipt of two different NFC tag identifiers.

7. The device of claim 1, wherein the processor is further configured to:
   when the first NFC tag identifier and second NFC tag identifier are the same, but are received in a time period greater than the given time period, determine that the single NFC tag has been detected twice, and that a redundant detection of the single NFC tag has not occurred.

8. The device of claim 7, wherein the processor is further configured to: control the notification device to provide a respective notification of each detection of the single NFC tag.

9. A method comprising:
   at device comprising; a sensor configured to receive NFC tag identifiers from at least one near field communication (NFC) tag; a notification device configured to provide notifications, the notification device comprising one or more of a display device, a speaker, an LED (light emitting diode), and a light; and, a processor,
      comparing a first NFC tag identifier to a second NFC tag identifier, both the first NFC tag identifier and the second NFC tag identifier having been received by the sensor within a given time period, the given time period comprising an amount of time the sensor takes to one or more of interrogate and read data from NFC tags;
      when the first NFC tag identifier and the second NFC tag identifier are the same, inferring that the first NFC tag identifier and the second NFC tag identifier are associated with a single NFC tag, and controlling the notification device to provide one notification of detecting the single NFC tag, the one notification provided after the first NFC tag identifier and the second NFC tag identifier are received and after determining that the first NFC tag identifier and the second NFC tag identifier are the same; and when the first NFC tag identifier and the second NFC tag identifier are not the same, inferring that the first NFC tag identifier and the second NFC tag identifier are associated with two different NFC tags, and controlling the notification device to provide respective notifications of detecting each of the first NFC tag identifier and the second NFC tag identifier, the respective notifications provided after the first NFC tag identifier and the second NFC tag identifier are received and after determining that the first NFC tag identifier and the second NFC tag identifier are different.

10. The method of claim 9, further comprising when the first NFC tag identifier is received, storing the first NFC tag identifier at a memory of the device.

11. The method of claim 10, further comprising: when the second NFC tag identifier is not received within the given time period, deleting the first NFC tag identifier from the memory.

12. The method of claim 9, wherein the given time period is one or more of: between about 0.5 seconds and about 2 seconds; and, less than about 2 seconds.

13. The method of claim 9, further comprising:
when the first NFC tag identifier and the second NFC tag identifier are the same implementing an action associated with receipt of a single NFC tag identifier; and
when the first NFC tag identifier and the second NFC tag identifier are not the same, implementing an action associated with the receipt of two different NFC tag identifiers.

14. The method of claim 9, further comprising:
when the first NFC tag identifier and second NFC tag identifier are the same, but are received in a time period greater than the given time period, determining that the single NFC tag has been detected twice, and that a redundant detection of the single NFC tag has not occurred.

15. The method of claim 14, further comprising: controlling the notification device to provide respective notification of each detection of the single NFC tag.

16. A non-transitory computer-readable medium storing a computer program, wherein execution of the computer program is for :

at device comprising; a sensor configured to receive NFC tag identifiers from at least one near field communication (NFC) tag; a notification device configured to provide notifications, the notification device comprising one or more of a display device, a speaker, an LED (light emitting diode), and a light; and, a processor, comparing a first NFC tag identifier to a second NFC tag identifier, both the first NFC tag identifier and the second NFC tag identifier having been received by the sensor within a given time period, the given time period comprising an amount of time the sensor takes to one or more of interrogate and read data from NFC tags;

when the first NFC tag identifier and the second NFC tag identifier are the same, inferring that the first NFC tag identifier and the second NFC tag identifier are associated with a single NFC tag, and controlling the notification device to provide one notification of detecting the single NFC tag, the one notification provided after the first NFC tag identifier and the second NFC tag identifier are received and after determining that the first NFC tag identifier and the second NFC tag identifier are the same; and when the first NFC tag identifier and the second NFC tag identifier are not the same, inferring that the first NFC tag identifier and the second NFC tag identifier are associated with two different NFC tags, and controlling the notification device to provide respective notifications of detecting each of the first NFC tag identifier and the second NFC tag identifier, the respective notifications provided after the first NFC tag identifier and the second NFC tag identifier are received and after determining that the first NFC tag identifier and the second NFC tag identifier are different.

* * * * *